Dec. 8, 1925.
J. T. SENTROP, JR
1,564,978
CYCLE SADDLE
Filed Sept. 25, 1922
3 Sheets-Sheet 2
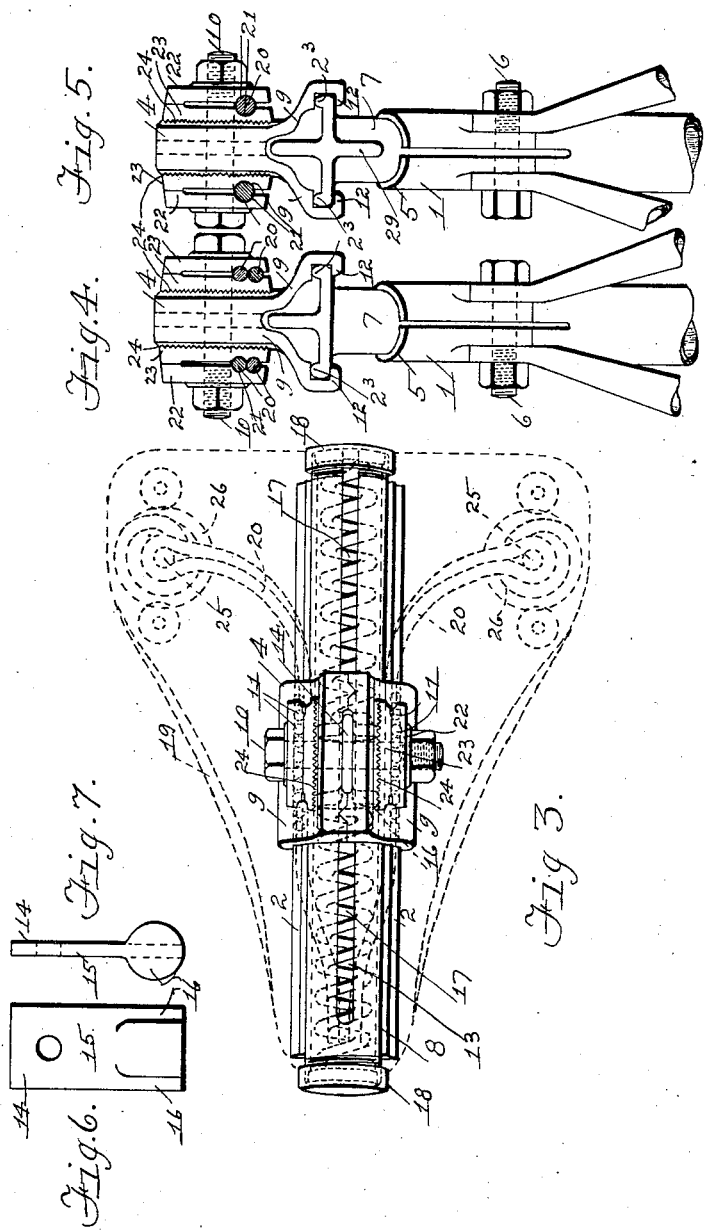
Inventor:
Johannes T. Sentrop, Jr.
by Cyrus W. Rice
Attorney.

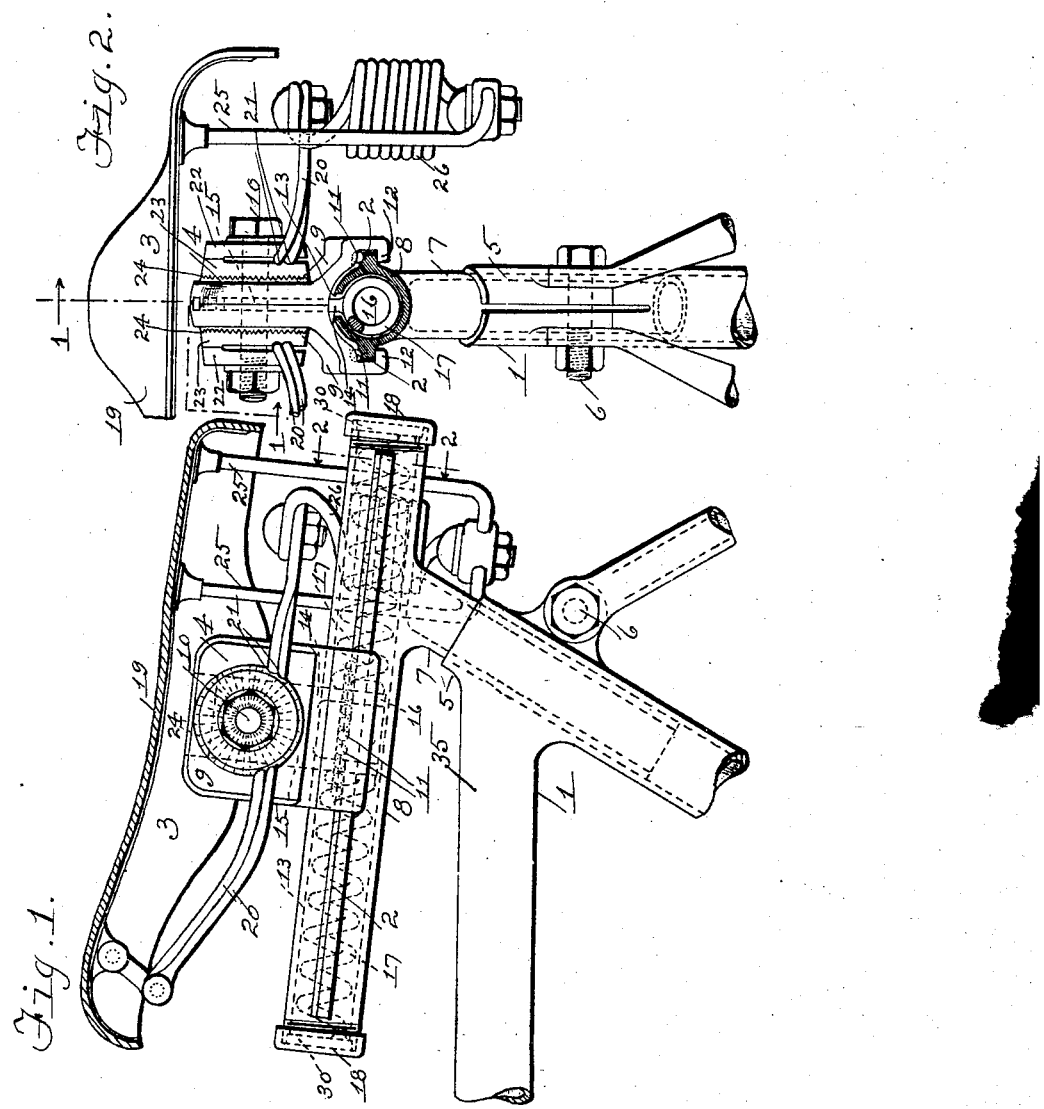

Dec. 8, 1925.  1,564,978
J. T. SENTROP, JR
CYCLE SADDLE
Filed Sept. 25, 1922   3 Sheets-Sheet 3
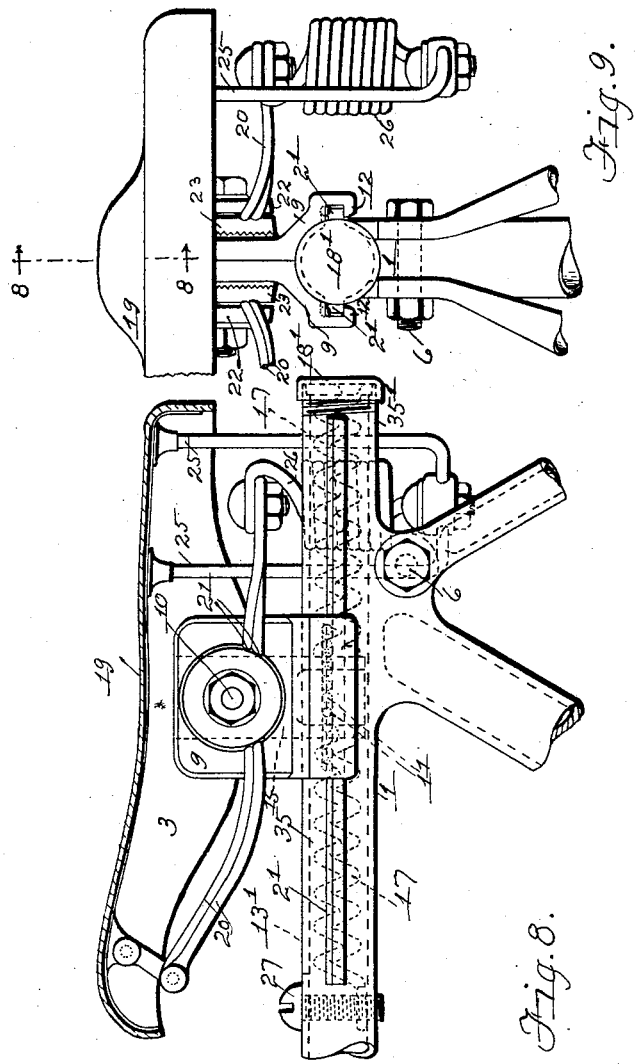

Patented Dec. 8, 1925.

UNITED STATES PATENT OFFICE.

1,564,978

JOHANNES T. SENTROP, JR., OF GRAND RAPIDS, MICHIGAN.

CYCLE SADDLE.

Application filed September 25, 1922. Serial No. 590,541.

*To all whom it may concern:*

Be it known that I, JOHANNES T. SENTROP, Jr., a subject of the Queen of the Netherlands, residing at Grand Rapids, in the county of Kent and State of Michigan, have invented new and useful Improvements in Cycle Saddles, of which the following is a specification.

The present invention relates to cycle saddles; and its object is to provide an improved saddle for bicycles, motorcycles and like vehicles, which saddle shall have a reciprocatory movement in the longitudinal direction of the vehicle, so that it may be readily moved by the rider seated thereon to any position forward or rearward he may at any time desire while driving or riding on the vehicle; and especially, to provide such a saddle having such reciprocatory movement in order that jars and jolts caused by sudden variations of its speed may not be suddenly transmitted to the rider; and more particularly, to provide for said purpose, cushioning means for yieldingly resisting said movement of the saddle.

These and any other objects hereinafter appearing are attained by, and the invention finds preferable embodiment in, the structure or structures hereinafter particularly described in the body of this specification and illustrated by the accompanying drawings, in which:—

Figure 1 is a side view of the upper rear portion of the frame of a bicycle, with a saddle mounted thereon, the saddle seat being sectioned on line 1—1 of Figure 2;

Figure 2 is a rear view of the same; partially sectioned on line 2—2 of Figure 1;

Figure 3 is a top plan view of portions of the same, the position of the saddle seat and its supporting members being shown in broken lines;

Figure 4 is a rear view of parts of the same illustrating a modified construction, the seat's supporting members being sectioned;

Figure 5 is a view similar to Figure 4 but showing another—a slightly modified—construction;

Figure 6 is a side view of a member of the carrier of the saddle;

Figure 7 is a front or rear view of the same;

Figure 8 is a side view of the upper rear portion of the frame of a bicycle, with a saddle mounted thereon, illustrating a modified construction, the saddle seat being sectioned on line 8—8 of Figure 9; and Figure 9 is a rear view of said modified construction.

In the embodiment of the invention chosen for illustration by the drawings and for detailed description in the body of this specification, the frame 1 of a bicycle is provided with a way or bearing 2 extending in the frame's longitudinal direction. A saddle 3 is supported on a carrier, designated generally 4, which has a reciprocatory movement on the way 2 in the frame's said longitudinal direction.

In the construction seen in Figures 1, 2 and 3, the frame's hollow member 5 (wherein the usual supporting pin of an ordinary saddle is clamped by the bolt 6) contains and clampingly holds a like supporting pin or tube 7 of a tubular portion 8 of the frame, which portion extends in said direction, and is provided on each side with the way or bearing 2 also extending in said direction. The carrier 4 in said construction comprises a pair of members 9, 9 clamped together by the screw 10 passing therethrough, the members 9 bearing on the ways 2 and anti-friction balls 11 being preferably provided between the members 9 and the ways 2 as shown. Each member 9 is also shown provided with an inwardly extending rib 12 slidably engaging the under side of the way 2 thus preventing laterally-rocking movement of the carrier about the axis of the tubular portion 8 of the frame. This tubular portion 8 has a slot 13 through its upper side or wall, extending in its longitudinal direction, through which slot extends upwardly the shank 14 of the carrier's member 15 having disk-like parts 16, 16 inside the tubular portion 8 and freely slidable therein. Springs 17, 17 abut on the parts 16 and against the screw caps 18, 18 respectively whereby the ends of the tubular portion 8 are closed. The shank 14 of the carrier's member 15 is clamped between the members 9, 9 by the bolt 10. The saddle 3 has the flexible seat 19 upheld by the supporting members 20 seated in registering grooves 21 of clamp members 22 and 23 by the bolt 10, said members 23 and the carrier's members 9 adjacent thereto respectively being provided with engaging teeth 24 extending radially from the bolt 10, so that the seat 19 may be tilted forwardly or rearwardly and held in such tilted position by said bolt. The supporting members 20 and the posts 25 of the seat 19 are connected by cushioning springs 26.

It will be seen that any sudden stopping of the forward movement of the bicycle or decrease in its forward speed is cushioned as to the rider seated on the saddle by the forward spring 17, and any sudden forward movement or increase of forward speed is similarly cushioned by the rear spring 17.

The construction above described is adapted for use in connection with bicycles of usual types, so that the ordinary saddle of such usual types may be removed and the pin 7 of my device inserted into the hollow member 5 of the ordinary bicycle frame and clamped therein by the bolt 6; but, as shown in the modified construction seen in Figures 8 and 9, the hollow upper tube 35 of the frame may be constructed so as to be utilized as and instead of the tubular portion 8 (shown in Figures 1, 2 and 3) by extending said upper tube 35 (if necessary) as seen at 35¹ in Figure 8; providing this tube with the ways 2¹, slot 13¹, screw cap 18¹ and an abutment, as the screw 27, and mounting the springs 17, 17 and carrier's member 15 in said tube 35.

For certain uses, the cushioning springs 17, 17 may be omitted. In such case, the jars and jolts of sudden stopping or decrease of forward speed may be absorbed by tilting the tubular portion 8 with its ways 2 upwardly at the forward end thereof as seen in Figure 1, so that the force of gravitation will increasingly arrest the forward movement of the saddle's carrier 4.

Moreover, the springs 17, 17 may be omitted, and the ways 2 disposed absolutely horizontally, and still the rider will be able to cushion his body against sudden jars and jolts by pressing his feet on the pedals of the cycle, and may adjust the position of the saddle forwardly or rearwardly to suit his convenience in the same manner.

In Figures 4 and 5, the supporting members 9, 9 slide on the ways 2³, the tubular portion 8 being dispensed with.

In Figure 5, a strengthening web or flange 29 is shown. Disks 30 are preferably provided seated in annular rabbets in the ends of the tubular portion 8 and held in place by the screw caps 18.

This application includes features disclosed but not claimed in my co-pending application Ser. No. 266,627, resulting in Patent No. 1,453,326, dated May 1, 1923.

The invention being intended to be pointed out in the claims, is not to be limited to or by details of construction of the particular embodiment thereof illustrated by the drawings or hereinbefore shown or described.

I claim:

1. In a vehicle of the character described: a frame; a carrier supported by, and having a reciprocatory movement on, the frame in its longitudinal direction; a saddle supported on the carrier turnable in a vertical plane parallel with said direction.

2. In a vehicle of the character described: a frame; a carrier supported by, and having a reciprocatory movement on, the frame in its longitudinal direction; a saddle supported on the carrier turnable in a vertical plane parallel with said direction; means for yieldingly resisting the carrier's said movement.

3. In a vehicle of the character described: a frame; a carrier supported by, and having a reciprocatory movement on, the frame in its longitudinal direction; a saddle supported on the carrier turnable in a vertical plane parallel with said direction; means for yieldingly resisting the carrier's said movement in both directions.

4. In a vehicle of the character described: a frame having a tubular portion extending axially in the frame's longitudinal direction, provided with a longitudinally extending slot and a way extending in its longitudinal direction inclined forwardly-upwardly; a carrier supported by, and having a reciprocatory movement on, said way and having a member extending through said slot and into said tubular portion; a spring in the tubular portion adapted to abut said member to yieldingly resist the carrier's said movement.

5. In a vehicle of the character described: a frame having a tubular portion extending axially in the frame's longitudinal direction, provided with a longitudinally extending slot and a way extending in its longitudinal direction inclined forwardly-upwardly; a carrier supported by, and having a reciprocatory movement on, said way and having a member extending through said slot and into said tubular portion; springs in the tubular portion adapted to abut said member to yieldingly resist the carrier's said movement.

In testimony whereof I have hereunto set my hand this 23rd day of July, 1923.

JOHANNES T. SENTROP, Jr.